United States Patent
Neff

[19]

[11] Patent Number: 6,064,493
[45] Date of Patent: May 16, 2000

[54] INK-JET PRINTER COLOR PALETTE SELECTION METHOD AND SYSTEM

[75] Inventor: David Neff, Brush Prairie, Wash.

[73] Assignee: Hewlett-Packard Company, Palo Alto, Calif.

[21] Appl. No.: 08/341,849

[22] Filed: Nov. 18, 1994

Related U.S. Application Data

[63] Continuation of application No. 07/954,785, Sep. 30, 1992, abandoned.

[51] Int. Cl.[7] .................................................... G06K 15/00
[52] U.S. Cl. ........................................... 358/1.9; 358/1.15
[58] Field of Search ........................... 395/108–110, 103, 395/117, 114; 358/500–502, 515, 539, 540, 1.8, 1.9, 1.11, 1.3, 1.18, 1.15

[56] References Cited

U.S. PATENT DOCUMENTS

| | | | |
|---|---|---|---|
| 4,413,275 | 11/1983 | Horiuchi et al. | 358/500 |
| 4,682,190 | 7/1987 | Ikeda | 346/154 |
| 4,683,492 | 7/1987 | Sagiura | 358/500 |
| 4,953,013 | 8/1990 | Tsuji et al. | 358/500 |
| 4,953,015 | 8/1990 | Hayasaki et al. | 358/79 |
| 5,057,852 | 10/1991 | Formica et al. | 346/1.1 |
| 5,153,617 | 10/1992 | Salmon | 346/157 |
| 5,168,552 | 12/1992 | Vaughn et al. | 315/109 |
| 5,226,175 | 7/1993 | Deutsch et al. | 395/119 |

*Primary Examiner*—Arthur G. Evans
*Attorney, Agent, or Firm*—Flory L. Martin

[57] ABSTRACT

The invented method involves the coding of color and black print image data for communication of the same from a printer server or driver to an ink-jet printer. The coding is such that true black or process black can be selected by the driver and can be used by a printer capable of producing both, i.e. an ink-jet printer equipped with a black ink pen and a tri-color ink pen. An invented print protocol permits one of a variety of color palettes to be selected on a print page basis. If the selected palette includes true black (K), then, for areas wherein only true black will be printed, the communication sequence in which the codes are sent to the printer requires none of the color selection coding. A four-plane, as well as other, palettes are described, with the four-plane palette including true black (K), cyan (C), magenta (M) and yellow (Y). Each of the four color planes in each palette is assigned a unique binary bit by the preferred coding method, thereby simplifying and reducing coding and decoding overhead for both the driver and the printer.

23 Claims, 1 Drawing Sheet

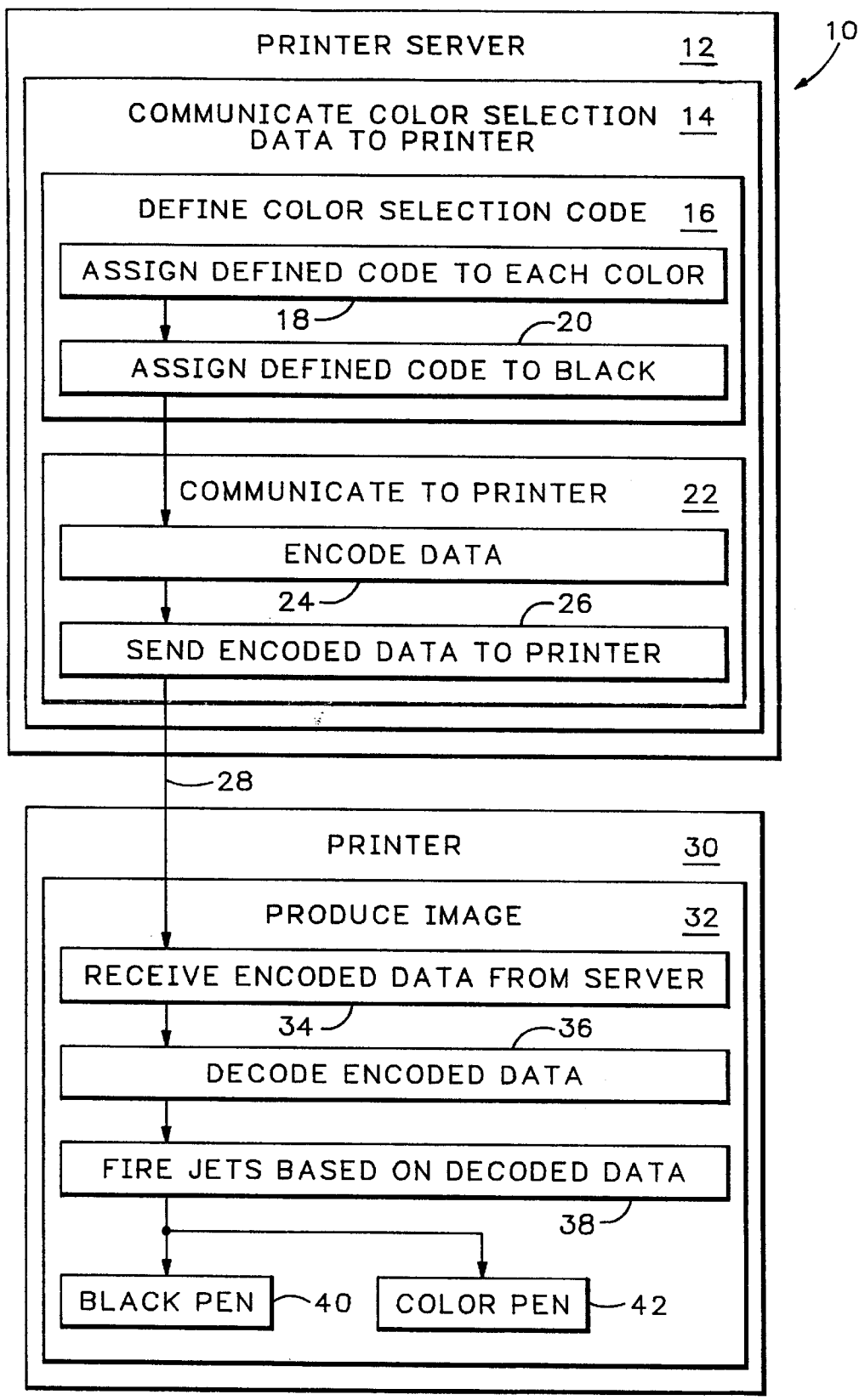

INK-JET PRINTER COLOR PALETTE SELECTION METHOD AND SYSTEM

CROSS REFERENCE TO RELATED APPLICATIONS(S)

This is a continuation of application serial number 07/954,785 filed on Sep. 30, 1992, now abandoned.

TECHNICAL FIELD

The present invention relates generally to color palette design for plural-pen ink-jet printers. More particularly, it concerns a selection and indexing method and system for black and tri-color ink-jet printer palettes that permits true black, composite black and three primitive or primary colors or their combination to be selected efficiently and conveniently for printing.

BACKGROUND ART

Single-pen, black or tri-color ink-jet printers are well-known. If it is desired with a tri-color ink-jet printer to produce black, color dots are closely interposed while printing, generally in equal spatial proportion, to give a black appearance. Such a black appearance produced by closely interposed tri-color ink dots (as well as gray-scaled output produced by variably less closely interposed tri-color ink dots) will be referred to herein as composite or process black, as opposed to what will be referred to herein as true black produced by depositing black ink drops on paper. Because a given one of these ink-jet printers might be equipped with either a true black pen or a tri- color pen, the host computer or file server, or what will be referred to herein as the driver software operating therein, somehow must be able to decide when to use process black and when to use true black. Black-to-color bleed that might occur in printed areas containing closely adjacent true black and color ink dots would require the driver software or the printer firmware, or both, to determine and to control when a black ink pen is to be used to produce true black and when process black is to be used.

The black-to-color bleed problem to which certain low-cost ink- jet printers are susceptible principally is caused by fundamental incompatibilities between the black ink and any of the tri-color inks. Black ink selection is somewhat constrained by requirements such as water-fastness and compatibility with regular paper stock. Accordingly, there are many ink-jet printer applications in which the use of incompatible black and color inks will continue. As a result, black-to-color bleeding problems remain.

The black-to-color bleed problem previously has been addressed by software methods that determine when to use true black and when to use process black for various printing applications. One such method is described in U.S. patent application Ser. No. 07/784,498 entitled "Color Separation in Ink-Jet Color Graphics Printing", which was filed Oct. 29, 1991, issued as U.S. Pat. No. 5,168,552 on Dec. 1, 1992, and which is subject to common ownership herewith. Familiarity with the algorithm described therein is assumed. In practice, implementation of the algorithm requires that the printer's firmware be able to determine when a black print control code received from the application software is to be printed with true black (K) and when it is to be printed with process black. Briefly, such determination might involve examining received tri-color dot placement data as to whether more than one color of ink, whether the primitives including cyan, magenta and yellow (CMY) or the primaries including red, green and blue (RGB), is destined for placement on the same pixel or dot location on the printed page. If so, the two-pen printer then could substitute each one of such interposed color dot occurrences with a single true black dot.

With the advent of two-pen ink-jet printers, and depending upon the printing application, it may be desirable to print either or both of true black and process black using a two-pen ink-jet printer that includes both a black pen and a tri-color pen, which the above-described automatic substitution method would render impossible. Accordingly, it is desirable to develop a full-color palette selection and control system for more capable ink-jet printers that is nevertheless compatible with existing software drivers and black-and-white and color printing applications. Preferably, the system would permit printing either process black using a tri-color ink-jet pen or true black using a black ink-jet pen, or both, and would be organized to be compatible with existing products and to be efficient in terms of color control coding and selection so that unneeded data not be sent to the printer.

DISCLOSURE OF THE INVENTION

The invented method involves the coding of color and black print image data for communication of the same from a printer server or driver to an ink-jet printer. The coding is such that true black or process black-can be selected by the driver and can be used by a printer capable of producing both, i.e. an ink-jet printer equipped with a black ink pen and a tri-color ink pen. An invented print protocol permits one of a variety of color palettes to be selected on a print page basis. If the selected palette includes true black (K), then, for areas wherein only true black will be printed, the communication sequence in which the codes are sent to the printer requires none of the color selection coding. A four-plane, as well as other, palettes are described, with the four-plane palette including true black (K), cyan (C), magenta (M) and yellow (Y). Each of the four color planes in each palette is assigned a unique binary bit by the preferred coding method, thereby simplifying and reducing coding and decoding overhead for both the driver and the printer.

These and additional objects and advantages of the present invention will be more readily understood after a consideration of the detailed description of the preferred method.

BRIEF DESCRIPTION OF THE DRAWING

The FIGURE shows a simplified flow diagram of the preferred method of carrying out the invention, and incorporates the elements of the preferred emobodiment in block form.

DETAILED DESCRIPTION OF THE PREFERRED METHOD AND BEST MODE OF CARRYING OUT THE INVENTION

The invented method 10 is for communicating color selection data to an ink-jet printer 30 having a black ink pen 40 and a plural-color ink pen 42, as indicated generally at 14. The method may be understood to include 1) assigning each of the plural colors of the plural-color ink pen a corresponding defined code as indicated at 18; 2) assigning the black color of the black ink pen a corresponding defined code as indicated at 20; and 3) communicating such defined codes, as indicated at 22 in a predetermined sequence in which the assigned black color code precedes the assigned plural color codes, to an ink-jet printer for printing. Such first assigning step preferably is performed by assigning three defined bits of a nibble, one bit per color, to the C, M and Y colors of a primitive colors pen. Such second assigning step preferably is performed by assigning a singular defined bit of the same nibble to the K color of the black ink pen. Such communicating step preferably is performed by conventional means, preferably bit serially, i.e. transmitting the coded nibble over a communications link to the ink-jet printer.

Those skilled in the art will appreciate that what will be referred to herein as the KCMY coding is preferable in communicating color plane information to the ink-jet printer. Conceptually, it is helpful to see the K bit is the least significant bit (LSB) and the Y bit is the most significant bit (MSB) of the coded nibble. In this way, the LSB, which is used to select black or white (a non-printed space) on the true black (K) ink pen may be transmitted without the remaining CMY bits being transmitted in the case of an image area having no color pixels.

The planes' indexing concept is preferable in implementing the invented method. It is important to understand that by planes is meant a stacked organization of planes, one for each of the pens in the ink-jet printer, i.e. a plane represents the plural on and off bits in a raster for each color including, for example, true black (K), cyan (C), magenta (M) and yellow (Y) in the case of the KCMY palette described herein. Thus, the nibble referred to herein represents a pixel-wide slice taken through the stacked KCMY planes. As a clarifying example, to print a blue pixel, the K plane bit corresponding to the pixel location would contain a binary 0 (representing an off pixel); the corresponding C plane bit would be a binary 1 (representing an on pixel); the M plane bit would be a binary 1 (representing an on pixel); and the Y plane bit would be a binary 0 (representing an off pixel). Thus, each bit in the nibble referred to herein effectively maps into a raster pixel plane per color, which colors, in the case of the KCMY palette include true black.

Thus, coding and decoding are simplified and communication time is reduced primarily because only a single black raster plane need be sent to the printer when it is determined by the server that a true black-only image area is to be printed. Other coding schemes, of course, are possible within the spirit and scope of the invention, but do not result in such time saving; indeed, any ordering of the bits within the nibble, planes within the palette and transmission of KCMY data nevertheless permits a printer server or driver to select between process black and true black for printing on a plural-pen printer equipped with a true black (K) ink pen and a tri-color (CMY or RGB) pen.

Another way of describing the invention is as follows. It may be seen alternatively to include 1) defining a color selection code as indicated at 16 including a uniquely located identifier for each color (C, M, Y) of the plural-color ink pen and a uniquely located identifier for the black (K) ink pen, with the identifiers indicating whether the corresponding color or black pen is selected for printing and with the identifiers further indicating, in the case of the plural-color ink pen which of the plural colors is selected for printing; 2) encoding printable image raster data in accordance with such defined codes to produce encoded black and color raster data as indicated 24; and 3) sending the encoded raster data to an ink-jet printer as indicated at 16.

It will be understood that the defining step preferably uses the KCMY palette described in Table 4, to be discussed below. It also will be understood that the raster data encoding step preferably includes the binary coding described above for entire black and color rasters, or printable swaths defined by plural ones of such codes. The sending step, of course, is similar to the communicating step described above, but involves the sending to the printer thus-encoded printable image raster data, e.g. via a communication link such as a wire or cable 28. Preferably, the invented method now being described further includes 4) receiving the encoded printable image raster data at the printer as indicated at 34; 5) decoding the same as indicated at 36 and 6) firing color and black ink jets of the printer's pens as indicated at 38, based upon the coded black and color identifiers, thereby to produce an ink dot image on paper as indicated generally at 32.

It will now be described how, by the invented method, a palette is selected by the printer driver or server. Preferably, an escape sequence is used to select predefined palette selection criteria that indicates to the printer the defined coding of the raster data within a printable page. Such an escape sequence is encoded by the server and sent to the printer at the beginning of a page—i.e. prior to the sending of the encoded raster data—and does not change during the printing thereof. For example, such an escape sequence would specify a signed decimal number the sign of which distinguishes between CMY and RGB palettes and the magnitude of which selects the particular palette such as the single-plane K palette, the three-plane CMY palette or the invented four-plane KCMY palette. It will be understood that the magnitude of the number, e.g. 4, would indicate to the ink-jet printer's controller that the KCMY palette is selected, and thereafter the controller would expect KCMY encoded data, as described above, to be received for the duration of the page or until a new escape sequence is received from the server.

Reiterating one of the advantages of the invented method, by using the LSB of the coded nibble to indicate the K color of the invented KCMY palette and by sending LSB first, or by color separating the data into four-color raster planes, the true black (K) ink dot data is all that need be sent during the printing of all true black image rasters, at potentially substantially reduced overhead.

The following Tables 1 through 4 summarize the wide variety of color selections made possible by the invented method. Those skilled in the art will understand the use of indices, or decimal ordinal numbers, in Tables 1 through 4 that correspond with color selection within a given palette. Such indices provide a convenient conceptual tool for understanding the invention and its use in color selection, as the indices may be used also to binary code, for example, the various selections. When the index number is converted to a binary number, each bit in this binary value then defines whether or not a particular bit in a color plane must be on or off to generate a particular color. For example, an index of 2 for the color pen in a CMY palette gives the binary value $010_2$. In this binary representation, 0, 1, and 0 correspond to the Y, M and C plane, respectively. Hence, a color index of 2 would represent, and could be used to select, the color magenta (M). An index of 3 is the binary $011_2$, which indicates that the bits in the magenta (M) and cyan (C) planes must be set, which could be used to select the color blue.

TABLE 1

SINGLE-PLANE PALETTE

| # of Planes | Index # | Black Pen |
|---|---|---|
| 1 | 0 | White |
|  | 1 | Black |

There is no distinction between a CMY or RGB single plane palettes. The value fields −1, 0, 1, +1 will all select this palette. By the preferred method, this is the default palette. Tables 2 and 3 now will be understood to enable the inkjet printer to print using either the CMY or RGB three-plane palette.

TABLE 2

THREE-PLANE CMY PALETTE

| # of Planes | Index # | Color Pen |
|---|---|---|
| 3 | 0 | White |
|   | 1 | Cyan |
|   | 2 | Magenta |
|   | 3 | Blue |
|   | 4 | Yellow |
|   | 5 | Green |
|   | 6 | Red |
|   | 7 | Black |

TABLE 3

THREE-PLANE RGB PALETTE

| # of Planes | Index # | Color Pen |
|---|---|---|
| 3 | 0 | Black |
|   | 1 | Red |
|   | 2 | Green |
|   | 3 | Yellow |
|   | 4 | Blue |
|   | 5 | Magenta |
|   | 6 | Cyan |
|   | 7 | White |

The invented four-plane KCMY palette is similar, but a fourth true black (K) plane is added to the color repertoire to permit plural-pen ink-jet printers equipped also with black ink pens alternatively to print true black or process black. As described above, the K plane corresponds to the low order, or least significant, binary bit and the K plane raster data may be the only one sent in certain cases.

TABLE 4

INVENTED FOUR-PLANE KCMY PALETTE

| # Planes/Rows | Index # | Black Pen | Color Pen |
|---|---|---|---|
| 4 | 0 | White | White |
|   | 1 | Black | White |
|   | 2 | White | Cyan |
|   | 3 | Black | Cyan |
|   | 4 | White | Magenta |
|   | 5 | Black | Magenta |
|   | 6 | White | Blue |
|   | 7 | Black | Blue |
|   | 8 | White | Yellow |
|   | 9 | Black | Yellow |
|   | 10 | White | Green |
|   | 11 | Black | Green |
|   | 12 | White | Red |
|   | 13 | Black | Red |
|   | 14 | White | Black |
|   | 15 | Black | Black |

The invented system of the invention now may be understood based upon an understanding of the invented method described above. Preferably, the invented color selection system includes an ink-jet printer server 12 capable of generating plural print color selection codes each corresponding to a pen in a plural-pen ink-jet printer. The system also includes any suitable means for communicating the selection codes in a predefined sequence to an ink-jet printer, as by conventional bit serial physical and logical equipment and protocol as indicated generally at 14 and 28. The system also includes an ink-jet printer 30 operatively connected to the communicating means and responsive to the sequence of codes for printing selectively with a pen to which the codes correspond. Of course, such selection is dependent upon the selection codes received from the printer server. Importantly, the selection codes generated by the server include criteria, e.g. K, C, M, Y coded information in the form of single-bit pixels or plural-bit rasters, for selecting black and color pens corresponding with the four color planes.

It will be understood that in accordance with the preferred method and system, print data may be sent a pixel at a time for all four colors (KCMY), but that it is preferred that the data be sent color-separated in time, i.e. a color raster at a time preferably with the K raster first. The beneficial result of the four-plane KCMY palette described herein is that it provides for server-controlled, and thus application-based, selection of either process black or true black printing. The beneficial result of the indexing system described herein is that, by sending a raster at a time of KCMY data, in that order, only true black raster data need be sent and received to print true black image areas on paper.

It is seen that, especially for ink-jet printers providing for true black (K) and tri-color (CMY or RGB) ink printing wherein black and colored ink drops cannot be deposited in a closely adjacent relationship without excessive black-to-color bleeding, the invented method and system provide a unique palette design, coding and selection that enables a printer server to utilize either true black or process black for black swath printing. In this way, the invented method and system make it possible for a printer server to optimize print quality without significant overhead. Indeed, the coding scheme as described in certain applications reduces the overhead required to communicate printable raster data to an ink-jet printer.

INDUSTRIAL APPLICABILITY

It may be seen then that the invented method and system provide an important utility for plural-pen ink-jet printers having a monochrome pen and a tri-color pen, especially where the monochrome pen's black ink is useful with, but composite-incompatible with, one or more of the tri-color pen's color inks. By providing a coding and selection method that enables a printer server to communicate pen-specific or color-specific color controls to the printer, the user is given control over whether the printer prints black and gray images using process black that interposes color dots, or true black printable with the black ink pen. Thus, color bleed problems with such printers can be avoided. The invented coding method is implemented efficiently by sending black pen selection criteria first in a color control coding sequence so that unnecessary color coding that follows need not be formatted by the server or regarded by the printer.

While the present invention has been shown and described with reference to the foregoing operational principles and preferred method and embodiment, it will be apparent to those skilled in the art that other changes in form and detail may be made therein without departing from the spirit and scope of the invention as defined in the appended claims.

I claim:

1. A method of using a computer printer server to generate color selection data for an inkjet printer having black ink and color ink pens capable of printing both black ink and color ink at a given pixel, the method comprising the steps of:

the server defining a color selection code for each pixel of an image to be printed, with the color selection code designating at least one of the black and color pens for each printed pixel of the image; and the server encoding the defined color selection code for each pixel of the image for communication to the printer, including the step of encoding of color selection codes for any said given pixel requiring printing of both black ink and color ink.

2. A method according to claim 1, wherein:

the image includes a first printed area containing closely adjacent black and color pixels; and the defining step comprises defining a color selection code for the first printed area to select at least one of the color ink pens for at least a portion of the black pixels in the first printed area.

3. A method according to claim 2, wherein the defining step comprises defining a color selection code for the first printed area to also select the black ink pen for black pixels in the first printed area.

4. A method according to claim 2, wherein the defining step comprises defining a color selection code for the first printed area to select process black designating all of the color pens for each black pixel in the first printed area.

5. A method according to claim 2, wherein:

the image further includes a second printed area containing only black pixels; and the defining step comprises defining a color selection code for the second printed area to select only the black pen for each black pixel in the second printed area.

6. A method according to claim 2, wherein the defining step comprises defining a color selection code for the first printed area to select the black ink pen and color ink pens for printing a blue color for at least a portion of the black pixels in the first printed area.

7. A method according to claim 1, further including the step of communicating the encoded color selection code for each pixel from the server to the printer.

8. A method according to claim 7, wherein:

the method further includes the step of indexing by color palette the encoded color selection codes for a group of pixels, with the color palette comprising one plane of data for each pen; and the communicating step comprises communicating the encoded color selection codes for the group of pixels by sequentially transmitting the planes of data from the server to the printer.

9. A method according to claim 8, wherein the group of pixels comprises a printable swath raster of pixels.

10. A method according to claim 8, wherein:

the color palette comprises a black plane of data corresponding to the black ink pen, and plural color planes of data corresponding to the color ink pens; and the communicating step comprises sequentially transmitting the black plane of data to the printer first.

11. A method according to claim 10, further including the step of omitting transmission of the plural color planes of data following transmission of a black plane of data having code designating printing with the black ink pen.

12. A method according to claim 8, further including the steps of:

the server selecting one of plural color palettes comprising a monochrome palette, a three color palette, and a four color palette; and the server sending an escape sequence to the printer indicating which one of plural color palettes was selected in the selecting step.

13. A method according to claim 12, wherein the monochrome palette comprises black ink only, wherein the three color palette comprises non-black ink, and wherein the three color palette comprises black ink and three color inks.

14. A method according to claim 12, wherein the selecting step is repeated for each page prior to printing by the printer.

15. An inkjet color selection system for printing an image having plural pixels, comprising:

an inkjet printer having black ink and color ink pens capable of printing both black ink and color ink at a given pixel;

a printer server that generates and encodes a color selection code for each pixel of the image, including color selection codes for any said given pixel requiring printing of both black ink and color ink; and wherein the inkjet printer pens are responsive to the encoded color selection code which designates at least one of the black and color pens for each printed pixel of the image.

16. An inkjet color selection system according to claim 15, wherein:

the inkjet printer is capable of printing an image having both, (a) true black printed with black ink, and (b) process black printed with ink from all of the color pens; and the server also encodes any color selection codes indicating printing with true black and any color selection codes indicating printing with process black.

17. An inkjet color selection system according to claim 15, further including a communications link that delivers the encoded color selection code from the server to the printer.

18. An inkjet color selection system according to claim 17, wherein the server encodes plural color selection codes in a predefined sequence; and the communications link communicates the plural color selection codes from the server to the printer in the predefined sequence.

19. An inkjet color selection system according to claim 18, wherein the predefined sequence of encoding by the server comprises encoding the plural color selection codes as plural-bit rasters of data.

20. An inkjet color selection system according to claim 18, wherein the communications link communicates the plural color selection codes color-separated in time, by sending a first color raster followed by sequential color rasters, with each color raster corresponding to one of the inkjet pens.

21. An inkjet color selection system according to claim 20, wherein the first color raster corresponds to the black ink pen.

22. A method according to claim 15, wherein the black ink is composite-incompatible with at least one color ink.

23. An inkjet color selection system according to claim 15, wherein the color ink pens are arranged as a single tri-color pen.

* * * * *